United States Patent
Kerr et al.

(10) Patent No.: US 7,492,191 B2
(45) Date of Patent: Feb. 17, 2009

(54) DESIGN STRUCTURE FOR HIGH SPEED DIFFERENTIAL RECEIVER WITH AN INTEGRATED MULTIPLEXER INPUT

(75) Inventors: Michael K. Kerr, Johnson City, NY (US); William F. Lawson, Vestal, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/869,115

(22) Filed: Oct. 9, 2007

(65) Prior Publication Data

US 2008/0024170 A1   Jan. 31, 2008

Related U.S. Application Data

(63) Continuation of application No. 11/393,343, filed on Mar. 30, 2006, now Pat. No. 7,355,452.

(51) Int. Cl.
*H03K 19/094* (2006.01)
*H03K 19/0175* (2006.01)

(52) U.S. Cl. .................................. 326/83; 326/117
(58) Field of Classification Search ............ 326/101, 326/82, 83, 86, 87, 68; 327/427, 435, 437, 327/581; 714/724
See application file for complete search history.

(56) References Cited

U.S. PATENT DOCUMENTS 7,043,674 B2 * 5/2006 Rearick et al. ............... 714/724
7,068,077 B1 * 6/2006 Reinschmidt ................ 326/83

* cited by examiner

*Primary Examiner*—Rexford Barnie
*Assistant Examiner*—Crystal L Hammond
(74) *Attorney, Agent, or Firm*—Cantor Colburn LLP

(57) ABSTRACT

A design structure embodied in a machine readable medium used in a design process includes high-speed interface between a first network component and a second network component, the interface including a positive voltage input (VINP) and a negative voltage input (VINN) for receiving an input data signal from the first network component; the positive voltage input (VINP) coupled to a negative output circuit (OUTN) and the negative voltage input (VINN) by a positive input bus and a negative input bus, the negative voltage input (VINN) also coupled to a positive output circuit (OUTP). Implementing the high-speed interface calls for applying a bias to the a positive input bus and a negative input bus to periodically multiplex a data signal, thus providing a common receiving path for functional data and wrap data of the data signal.

4 Claims, 4 Drawing Sheets

DESIGN STRUCTURE FOR HIGH SPEED DIFFERENTIAL RECEIVER WITH AN INTEGRATED MULTIPLEXER INPUT

CROSS-REFERENCE TO RELATED APPLICATIONS

This non-provisional U.S. patent application is a continuation in part of U.S. patent application Ser. No. 11/393,343, which was filed Mar. 30, 2006, and is assigned to the present assignee.

BACKGROUND OF THE INVENTION

1. Field of the Invention

This invention relates to high-speed interfaces for computer network systems.

2. Description of the Background

When designing a high-speed interface between network components, there is typically a need for wrapping data back through transmitter and receiver circuitry. The wrapping back of data provides for verifying functionality as a "built in self test" (BIST). Preferably, a wrap path operates at functional speeds so that as much of the functional path as possible is used with out a performance penalty. One existing (prior art) approach for implementing the wrap path is depicted in FIG. 1.

Referring to FIG. 1, the illustration therein depicts prior art circuitry for verifying functionality of a high-speed interface implemented in a receive path 9. In this embodiment, a wrap path 5 for a receiver 8 is a mirror of a functional data path 6. The wrap path 5 is multiplexed in to the data path 6 after a second data receive stage. This design, or designs similar thereto, have typically been applied so that the data path 6 was not impaired by circuitry for the wrap path 5. Unfortunately, such designs have at least one drawback in that the actual circuitry of the data path 6 is not used. A second drawback is realized by having a multiplexer 4 in the data path 6, which causes added latency and jitter in a data signal.

What is needed is a high-speed interface between network components that provides for wrapping back of data and for verifying functionality thereof. Preferably, the high-speed interface makes use of an existing data path to provide for accurate communication, without causing latency and jitter in the data signal.

SUMMARY OF THE INVENTION

Disclosed is a design structure embodied in a machine readable medium used in a design process, the design structure including a high speed interface for communicating a data signal having functional data and wrap data between a first network component and a second network component, the interface including a positive voltage input (VINP) and a negative voltage input (VINN) for receiving an input data signal from the first network component; the positive voltage input (VINP) coupled to a negative output circuit (OUTN) and the negative voltage input (VINN) by a positive input bus and a negative input bus, the negative voltage input (VINN) also coupled to a positive output circuit (OUTP); the negative output circuit (OUTN) and the positive output circuit (OUTP) coupled to a common operating point; wherein a transmission gate in the negative output circuit (OUTN) provides a negative output data signal from the common operating point for the second network component and another transmission gate in the positive output circuit (OUTP) provides a positive output data signal from the common operating point for the second network component.

Also disclosed is a design structure embodied in a machine readable medium used in a design process, the design structure including high speed interface for communicating a data signal having functional data and wrap data between a first network component and a second network component, the interface including a positive voltage input (VINP) coupled to a gate of a positive field effect transistor (PFET) and a gate of an negative field effect transistor (NFET) and a negative voltage input (VINN), coupled to a gate of another positive field effect transistor (PFET) and a gate of another negative field effect transistor (NFET); a negative output circuit (OUTP) comprising a plurality of NFET and a plurality of PFET and a positive output circuit (OUTP) comprising another plurality of NFET and another plurality of PFET; wherein one of a source and a drain of the PFET in the positive voltage input (VINP) is coupled to a coupling between the NFET in the plurality of NFET and one of a source and a drain of the NFET in the positive voltage input (VINP) is coupled to a coupling between the PFET in the plurality of PFET; wherein one of a source and a drain of the another PFET in the negative voltage input (VINN) is coupled to a coupling between the NFET in the another plurality of NFET and one of a source and a drain of the another NFET in the negative voltage input (VINN) is coupled to a coupling between the PFET in the another plurality of PFET, wherein, the remaining one of the source and the drain for the another PFET is coupled to the remaining one of the source and the drain for the PFET in the positive voltage input (VINP) to form a positive input bus and the remaining one of the source and the drain for the another NFET is coupled to the remaining one of the source and the drain for the NFET in the positive voltage input (VINP) to form a negative input bus; wherein a gate for each of the NFET and each of the PFET in the negative output circuit (OUTN) and the positive output circuit (OUTP) are coupled to a common operating point; wherein the negative output circuit (OUTN) comprises a transmission gate coupled to the common operating point and at least one NFET of the plurality and at least one PFET of the plurality and the positive output circuit (OUTP) comprises another transmission gate coupled to the common operating point and at least one NFET of the another plurality and at least one PFET of the another plurality; wherein one of a source and a drain for a positive bias device is coupled to the positive input bus and one of a source and a drain for a negative bias device is coupled to the negative input bus; and, wherein functional data and wrap data from the first network component is submitted to the positive voltage input (VINP) and the negative voltage input (VINN) and passed to the second network component via the negative output circuit (OUTP) and the positive output circuit (OUTP).

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which provides for a high-speed differential receiver having integrated multiplexer input. The receiver provides for receiving wrap data and functional data in a common path thus providing for improved speed, reduced latency and jitter as well as improved stability in an interface between a first network component and a second network component over prior art interfaces implementing a dual data path.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
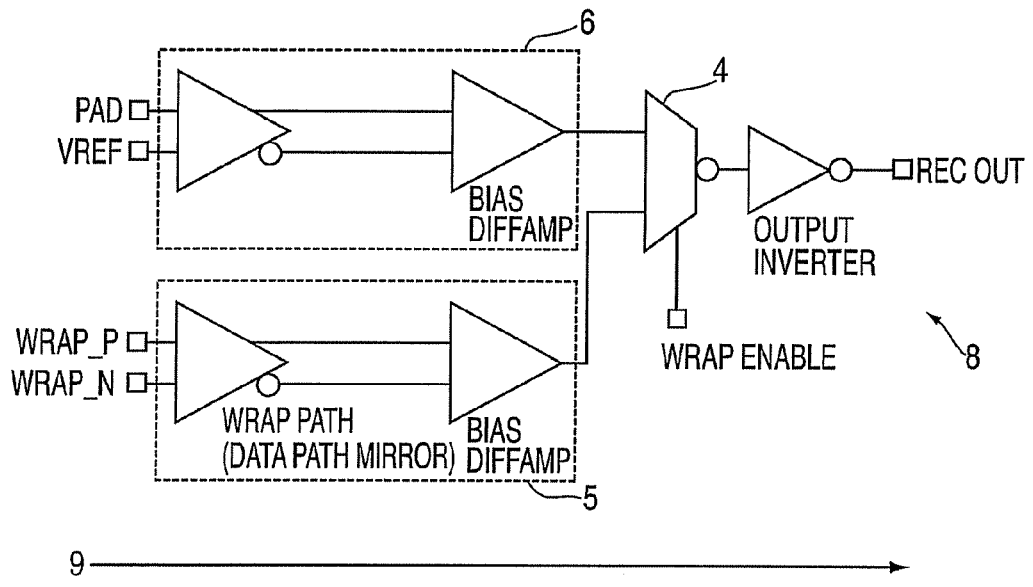
FIG. 1 illustrates one example of a prior art high-speed interface having a wrap back path.
Figure 2:
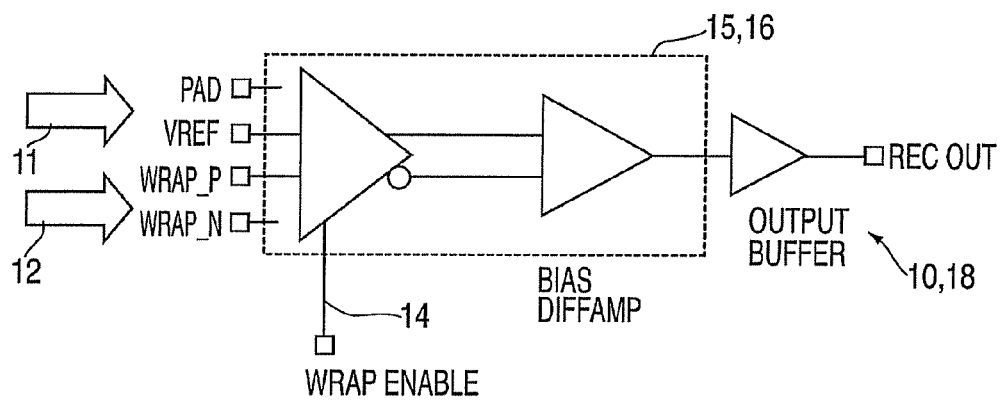
FIG. 2 illustrates one example of a wrap back path in accordance with the teachings herein.

Turning now to the drawings in greater detail, it will be seen that in FIG. 2 there is a high-speed interface 10 according to the present invention. The high-speed interface 10 includes a multiplexing function 14 within the first stage of a receiver 18. In this embodiment, the multiplexing function 14 is included within a first stage of the receiver 18. Implementing a wrap path 15 in this fashion provides for using a data path 16 as the receive path 19. This design eliminates the uncertainty of the prior art, which makes use of parallel paths. Further, by removing a traditional multiplexer 4 from the receive path 19 (the multiplexer 4 selecting which path is propagated to an output) a reduction in both latency and jitter is realized.

In order to clearly distinguish aspects of data, as discussed herein, a data signal includes functional data 11 as well as wrap data 12. The functional data 11 includes many types of data for communication through the high-speed interface 10. Wrap data 12 includes the portion of data for wrapping back through the high-speed interface 10, and typically provides for verifying functionality through a "built in self test" (BIST). One skilled in the art will recognize that in various instances functional data 11 and wrap data 12 may include various relationships such as being interchangeable or a subset of one or the other.

In typical embodiments, the high-speed interface 10 makes use of field effect transistors (FETs). FETs include three terminals, or leads. The terminals include a drain, a source and a gate. FETs can switch signals of either polarity on the source terminal or the drain terminal if the signal amplitude is significantly less than the gate swing amplitude, as FET devices are typically symmetrical (about the source terminal and the drain terminal). This makes FETs suitable for a variety of switching tasks, including switching analog signals between paths (multiplexing).

Figure 3:
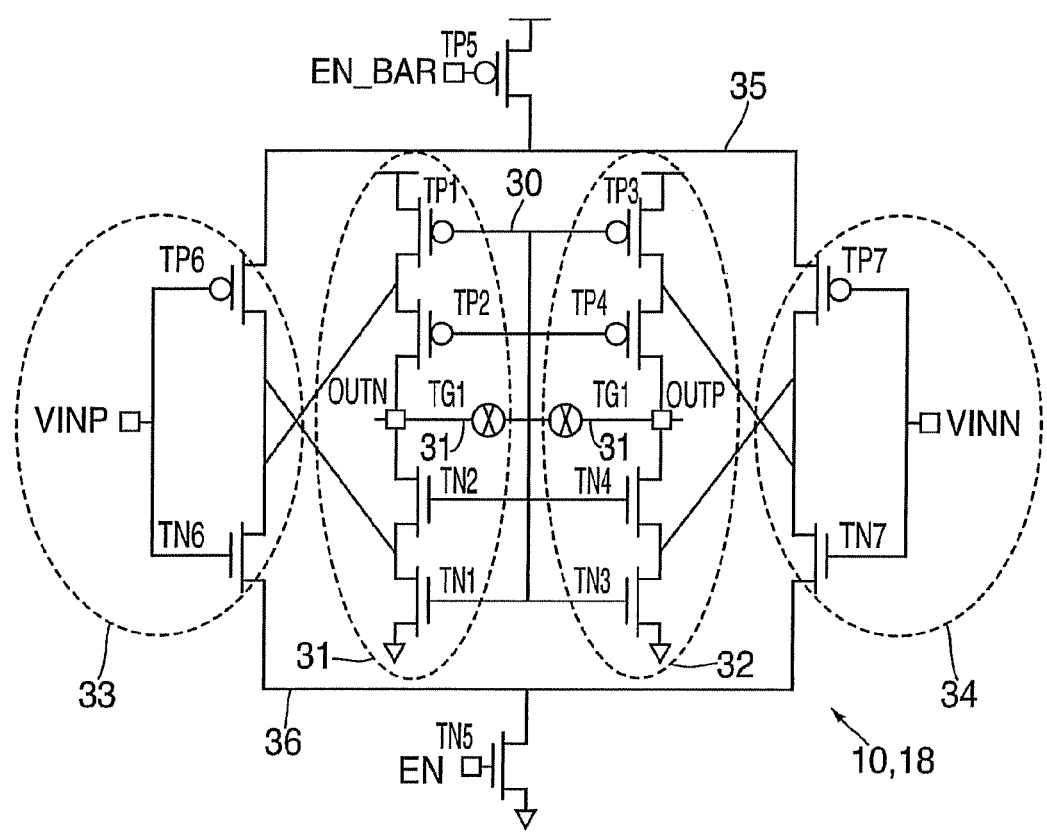
FIG. 3 illustrates aspects of input and output signals for a high-speed interface.

FIG. 3 provides a typical embodiment of a circuit implementing the high-speed interface 10. In this embodiment, an input stage of the receiver 18 accommodates inputs of wrap data 12. In FIG. 3, the input stage of the receiver 18 has a positive voltage input (VINP) 33 and a negative voltage input (VINN) 34. In this embodiment, the VINP 33 includes a positive field effect transistor (PFET) TP6 and a negative field effect transistor (NFET) TN6. A gate for each of TP6 and TN6 are coupled to receive a positive input signal. The VINN 34 similarly includes a positive field effect transistor (PFET) TP7 and a negative field effect transistor (NFET) TN7. Also similarly, a gate for each of TP7 and TN7 are coupled to receive a negative input signal.

In this exemplary circuit, a common operating point 30 is formed by a common coupling of a negative output circuit 31 and a positive output circuit 32. In this illustration, the negative output circuit 31 includes positive field effect transistor (PFET) devices TP1, TP2, with negative field effect transistor (NFET) devices TN1, TN2, while the positive output side includes PFET devices TP3, TP4 and NFET devices TN3, TN4. The common coupling is formed by the coupling of a gate for each of the PFET and the NFET in the negative output circuit 31 with each of the PFET and the NFET in the positive output circuit 32.

In this embodiment of the negative output circuit 31, a coupling of one of a drain and a source for TN1 to one of the drain and the source for TN2 is made. The remaining lead of TN2 (either one of the drain or the source) is coupled to an output node OUTN. Likewise, a coupling of one of a drain and a source for TP1 to one of the drain and the source for TP2 is made. The remaining lead of TP2 (either one of the drain or the source) is coupled to an output node OUTN. The output node OUTN is coupled to the common operating point 30 by a transmission gate TG1.

In this embodiment of the positive output circuit 32, a coupling of one of a drain and a source for TN3 to one of the drain and the source for TN4 is made. The remaining lead of TN4 (either one of the drain or the source) is coupled to an output node OUTP. Likewise, a coupling of one of a drain and a source for TP3 to one of the drain and the source for TP4 is made. The remaining lead of TP4 (either one of the drain or the source) is coupled to an output node OUTP. The output node OUTP is coupled to the common operating point 30 by a transmission gate TG2.

The output signals include a negative output signal through the output node OUTN and a positive output signal through the output node OUTP. The transmission gates TG1 and TG2 are coupled to the common operating point 30 and provide a feedback path 31 for the wrap data 12.

The positive voltage input 33 is coupled to the negative output circuit 31. This coupling is realized, in part, by coupling one of a drain and a source for the PFET TP6 to the coupling between TN1 and TN2. The coupling is completed by coupling one of a drain and a source for the NFET TP6 to the coupling between TP1 and TP2.

The negative voltage input 34 is coupled to the positive output circuit 32. This coupling is realized, in part, by coupling one of a drain and a source for the PFET TP7 to the coupling between TN3 and TN4. The coupling is completed by coupling one of a drain and a source for the NFET TN7 to the coupling between TP3 and TP4.

The positive voltage input 33 is also coupled to the negative voltage input 34 by a positive input bus 35 and a negative input bus 36. To form the positive input bus 35, a remaining lead (one of the source and the drain) for TP6 is coupled to the remaining lead (one of the source and the drain) for TP7. Likewise, to form the negative input bus 36 the remaining lead (one of the source and the drain) for TN6 is coupled to the remaining lead (one of the source and the drain) for TN7.

Coupled to the positive input bus 35 and the negative input bus 36 are a PFET TP5 and an NFET TN5, respectively. The bias devices TP5 and TN5 provide a current path to swing the output nodes OUTP and OUTN. The bias for PFET TP5 is turned on by input EN_BAR and the bias for NFET TN5 is turned on by input EN.

It should be noted that the terms "positive voltage input," "negative voltage input," "negative output circuit," "positive output circuit" "positive input bus," and "negative input bus" are presented and defined merely for convenience of referencing and to lend an understanding to the teachings. These terms are not intended to limit aspects of the design or the teachings in any way and are only provided to introduce and better describe aspects of the high-speed interface 10.

The exemplary embodiment depicted in FIG. 3 can be modified to provide a high-speed differential multiplexer. One exemplary modification calls for using the bias devices PFET TP5 and NFET TN5 to select a primary receive path (data path 16) and periodically disabling the bias devices to provide a wrap data path 15 as a second path. This modification provides one way to implement the logical built-in-self-test BIST function.

Figure 4:
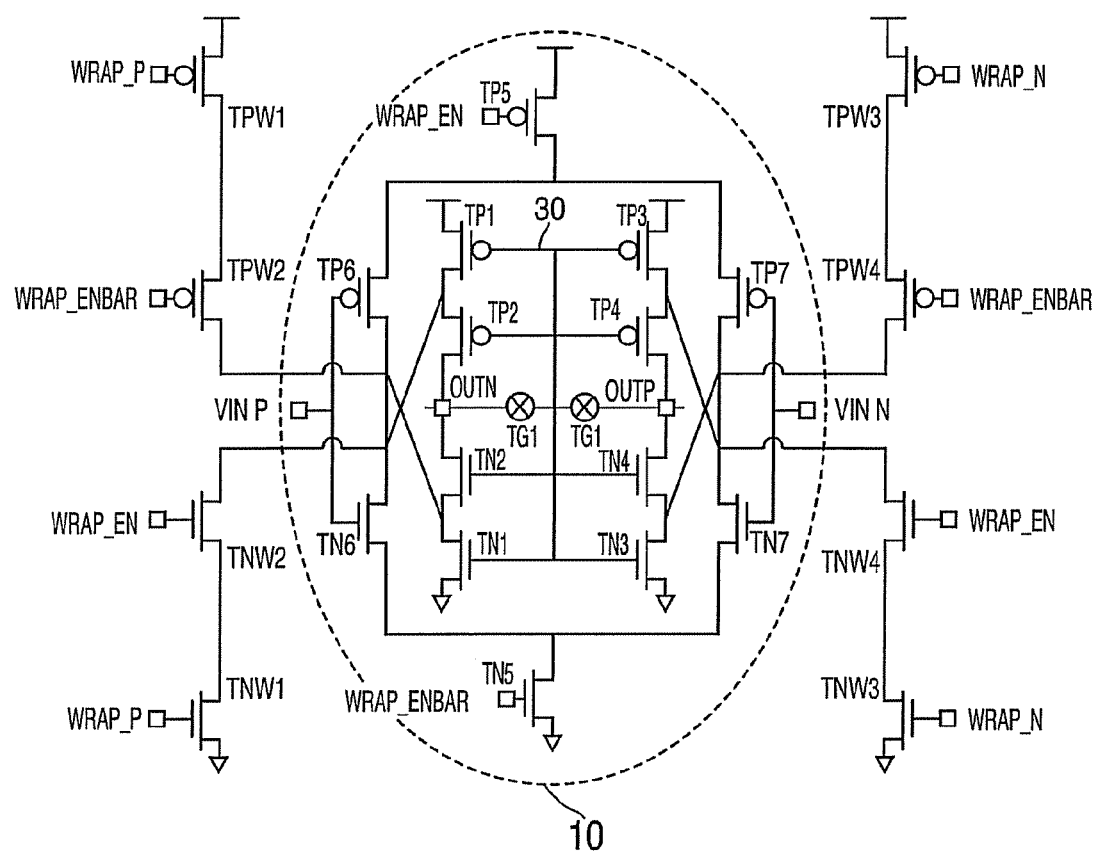
FIG. 4 illustrates one example of a modification to the circuit depicted in FIG. 3.

FIG. 4 depicts an embodiment that is a modification to the circuit depicted in FIG. 3. In this embodiment, a second input path is provided to pass the wrap data 12. In FIG. 4, the circuit for the high-speed interface 10 is represented by PFET TP1 through PFET TP7 and NFET TN1 through NFET TN7.

This embodiment includes WRAP_EN and WRAP_EN-BAR inputs for selection of a primary data path (receive) from the positive voltage input signal (VINP) and the negative voltage input signal (VINN). Alternatively, the WRAP_EN and WRAP_ENBAR inputs are provided for logic wrap inputs WRAP_P and WRAP_N to propagate to OUTP and OUTN. In this embodiment, the WRAP_EN and WRAP_EN-BAR inputs on devices PFETs TPW2, TPW4 and NFETs TNW2, TNW4 are placed between the wrap input devices PFETs TPW1, TPW3 and NFETs TNW1, TNW3 and the rest of the circuitry. This placement provides isolation of the wrap input and limits degradation or corruption of performance in the primary receive data path.

Typically, the high-speed interface 10 is used as a high-speed differential receiver with an integrated multiplexer input.

Figure 5:
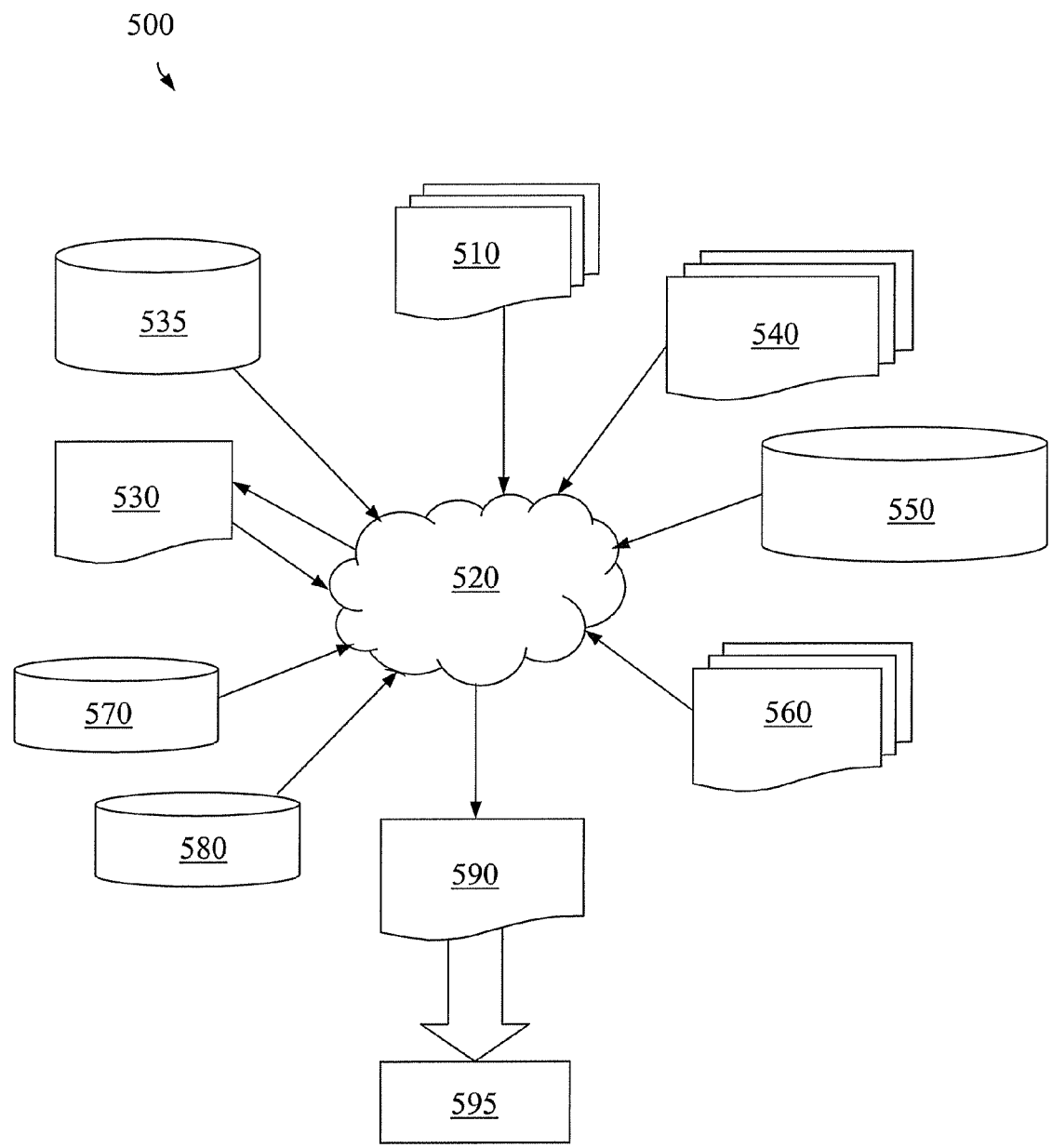
FIG. 5 is a flow diagram of an exemplary design process used in semiconductor design, manufacturing, and/or test.

FIG. 5 is a block diagram illustrating an example of a design flow 500. Design flow 500 may vary depending on the type of IC being designed. For example, a design flow 500 for building an application specific IC (ASIC) will differ from a design flow 500 for designing a standard component. Design structure 510 is preferably an input to a design process 520 and may come from an IP provider, a core developer, or other design company or may be generated by the operator of the design flow, or from other sources. Design structure 510 comprises circuit embodiments 10 in the form of schematics or HDL, a hardware-description language, (e.g., Verilog, VHDL, C, etc.). Design structure 510 may be contained on one or more machine readable medium(s). For example, design structure 510 may be a text file or a graphical representation of circuit embodiments 10. Design process 520 synthesizes (or translates) circuit embodiments 10 into a netlist 530, where netlist 530 is, for example, a list of wires, transistors, logic gates, control circuits, I/O, models, etc., and describes the connections to other elements and circuits in an integrated circuit design and recorded on at least one of machine readable medium 515. This may be an iterative process in which netlist 530 is resynthesized one or more times depending on design specifications and parameters for the circuit.

Design process 520 includes using a variety of inputs; for example, inputs from library elements 535 which may house a set of commonly used elements, circuits, and devices, including models, layouts, and symbolic representations, for a given manufacturing technology (e.g., different technology nodes, 32 nm, 45 nm, 90 nm, etc.), design specifications 540, characterization data 550, verification data 560, design rules 570, and test data files 580, which may include test patterns and other testing information. Design process 520 further includes, for example, standard circuit design processes such as timing analysis, verification tools, design rule checkers, place and route tools, etc. One of ordinary skill in the art of integrated circuit design can appreciate the extent of possible electronic design automation tools and applications used in design process 520 without deviating from the scope and spirit of the invention. The design structure of the invention embodiments is not limited to any specific design flow.

Design process 510 preferably translates an embodiment of the invention as shown in FIGS. 2, 3 and 4, along with any additional integrated circuit design or data (if applicable), into a second design structure 590. Second design structure 590 resides on a storage medium in a data format used for the exchange of layout data of integrated circuits (e.g. information stored in a GDSII (GDS2), GL1, OASIS, or any other suitable format for storing such design structures). Second design structure 590 may comprise information such as, for example, test data files, design content files, manufacturing data, layout parameters, wires, levels of metal, vias, shapes, data for routing through the manufacturing line, and any other data required by a semiconductor manufacturer to produce an embodiment of the invention as shown in FIGS. 2, 3 and 4. Second design structure 590 may then proceed to a stage 595 where, for example, second design structure 590: proceeds to tape-out, is released to manufacturing, is released to a mask house, is sent to another design house, is sent back to the customer, etc.

Although the exemplary embodiments depicted herein are illustrated as hardware implementations, it should be recognized that the capabilities of the present invention may be implemented in software, firmware, hardware or some combination thereof. As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A design structure comprising:
   a high speed interface for communicating a data signal comprising functional data and wrap data between a first network component and a second network component, the interface comprising a positive voltage input (VINP) coupled to a gate of a positive field effect transistor (PFET) and a gate of an negative field effect transistor (NFET) and a negative voltage input (VINN), coupled to a gate of another positive field effect transistor (PFET) and a gate of another negative field effect transistor (NFET);

a negative output circuit (NFET) comprising a plurality of NFET and a plurality of PFET and a positive output circuit (OUTP) comprising another plurality of NFET and another plurality of PFET;

wherein one of a source and a drain of the PFET in the positive voltage input (VINP) is coupled to a coupling between the NFET in the plurality of NFET and one of a source and a drain of the NFET in the positive voltage input (VINP) is coupled to a coupling between the PFET in the plurality of PFET;

wherein one of a source and a drain of the another PFET in the negative voltage input (VINN) is coupled to a coupling between the NFET in the another plurality of NFET and one of a source and a drain of the another NFET in the negative voltage input (VINN) is coupled to a coupling between the PFET in the another plurality of PFET, wherein, the remaining one of the source and the drain for the another PFET is coupled to the remaining one of the source and the drain for the PFET in the positive voltage input (VINP) to form a positive input bus and the remaining one of the source and the drain for the another NFET is coupled to the remaining one of the source and the drain for the NFET in the positive voltage input (VINP) to form a negative input bus;

wherein a gate for each of the NFET and each of the PFET in the negative output circuit (OUTN) and the positive output circuit (OUTP) are coupled to a common operating point;

wherein the negative output circuit (OUTN) comprises a transmission gate coupled to the common operating point and at least one NFET of the plurality and at least one PFET of the plurality and the positive output circuit (OUTP) comprises another transmission gate coupled to the common operating point and at least one NFET of the another plurality and at least one PFET of the another plurality;

wherein one of a source and a drain for a positive bias device is coupled to the positive input bus and one of a source and a drain for a negative bias device is coupled to the negative input bus; and, wherein functional data and wrap data from the first network component is submitted to the positive voltage input (VINP) and the negative voltage input (VINN) and passed to the second network component via the negative output circuit (OUTP) and the positive output circuit (OUTP).

2. The design structure of claim 1, wherein the design structure comprises a netlist describing the high-speed interface.

3. The design structure of claim 1, wherein the design structure resides on storage medium as a data format used for the exchange of layout data of integrated circuits.

4. The design structure of claim 1, wherein the design structure includes at least one of test data files, characterization data, verification data, programming data, or design specifications.

* * * * *